United States Patent
Tajima

(10) Patent No.: US 7,781,996 B2
(45) Date of Patent: Aug. 24, 2010

(54) SPEED CONTROL DEVICE FOR ELECTRIC MOTOR

(75) Inventor: Hirokazu Tajima, Suzuka (JP)

(73) Assignee: Fuji Electric Systems Co., Ltd. (JP)

( * ) Notice: Subject to any disclaimer, the term of this patent is extended or adjusted under 35 U.S.C. 154(b) by 227 days.

(21) Appl. No.: 11/767,041

(22) Filed: Jun. 22, 2007

(65) Prior Publication Data

US 2007/0296361 A1 Dec. 27, 2007

(30) Foreign Application Priority Data

Jun. 23, 2006 (JP) ............................. 2006-174021

(51) Int. Cl.
H02P 7/00 (2006.01)
(52) U.S. Cl. .................. 318/268; 318/632; 318/400.15; 318/400.18; 318/721
(58) Field of Classification Search ................ 318/268, 318/632, 638, 400.15, 400.17, 400.18, 721
See application file for complete search history.

(56) References Cited

U.S. PATENT DOCUMENTS

| | | | | | |
|---|---|---|---|---|---|
| 5,304,905 | A | * | 4/1994 | Iwasaki | 318/561 |
| 5,900,704 | A | * | 5/1999 | Henninger et al. | 318/268 |
| 6,864,650 | B2 | * | 3/2005 | Heravi et al. | 318/280 |
| 7,030,588 | B2 | * | 4/2006 | Tsuruta et al. | 318/727 |
| 7,075,259 | B2 | * | 7/2006 | Nakai et al. | 318/432 |
| 2004/0085035 | A1 | * | 5/2004 | Tazawa et al. | 318/432 |

FOREIGN PATENT DOCUMENTS

| | | |
|---|---|---|
| EP | 0 948 124 B1 | 11/2008 |
| JP | 1-218389 A | 8/1989 |
| JP | 4-071381 A | 3/1992 |
| JP | 7-044862 A | 2/1995 |
| JP | 7-306111 A | 11/1995 |
| JP | 8-249031 A | 9/1996 |
| JP | 2663684 B2 | 10/1997 |
| JP | 2000-078874 A | 3/2000 |
| JP | 2005-045956 A | 2/2005 |

OTHER PUBLICATIONS

Office Action issued in corresponding German Patent Application No. 102007028914.8 dated Jun. 29, 2009.
Machine translation of JP 2663684.

* cited by examiner

*Primary Examiner*—Bentsu Ro
*Assistant Examiner*—Thai Dinh
(74) *Attorney, Agent, or Firm*—Rossi, Kimms & McDowell LLP

(57) ABSTRACT

In a speed control device including a speed instruction generating unit, an addition computing unit, a speed control unit, a current controlling unit, an inertia estimating unit, an inertia setting unit, a switching unit and a constant setting unit, when it is possible to perform accelerating or decelerating operation of the electric motor to estimate the inertia moments of the electric motor and a driving target thereof, an operation is carried out to derive an inertia moment estimation value. The proportional gain of the speed control unit is set through the switching unit and the constant setting unit on the basis of the inertia moment estimation value. When it is impossible to perform the above operation, the proportional gain of the speed control unit is set through the switching unit and the constant setting unit on the basis of the inertia moment manual set value.

5 Claims, 3 Drawing Sheets

15 : INERTIA ESTIMATING UNIT

SPEED CONTROL DEVICE FOR ELECTRIC MOTOR

BACKGROUND OF THE INVENTION

1. Field of the Invention

The present invention relates to a speed control device for an electric motor.

2. Description of the Related Art

A method of automatically adjusting a control constant in a speed control unit constituting a speed control device for variably controlling the speed of an electric motor is disclosed in JP-A-1-218389, for example. According to this method, a disturbance signal is applied to the output of the speed control unit to vary the speed of the electric motor, the total of the moment of inertia of the electric motor and the moment of inertia of a driving target is estimated on the basis of the speed of the electric motor and the current of the electric motor at this time, and then the control constant of the speed control unit is automatically set on the basis of the estimation value.

According to the conventional method of estimating the inertia moments of the electric motor and the driving target, it is required to rotate the electric motor through the speed control device and further inject a disturbance signal into the speed control device. However, it may be impossible to rotate the electric motor under some operating conditions of the driving target, so that the disturbance signal cannot be injected into the speed control device. Therefore, there is a problem that the control constant cannot be set in the speed control unit constituting the speed control device.

SUMMARY OF THE INVENTION

An object of the present invention is to provide a speed control device for an electric motor that can solve the above problem.

According to a first aspect of the present invention, a speed control device for variably controlling the speed of an electric motor uses a speed control unit in which at least a control constant can be changed. The speed control unit has an inertia estimating unit for estimating the total of the inertia moment of the electric motor and the inertia moment of a driving target and for outputting the estimation result as an inertia moment estimation value. The speed control unit also has an inertia setting unit for manually setting the inertia moment and for outputting the manually set inertia moment as an inertia moment manual set value. The control unit additionally has a switching unit for switching to and outputting one of the inertia moment estimation value or the inertia moment manual set value in accordance with whether the inertia moment can be estimated or not, and a constant setting unit for setting the control constant of the speed control unit on the basis of the output value of the switching unit.

According to a second aspect of the present invention, in the speed control device for the electric motor according to the first aspect, when the electric motor is controlled to make an accelerating motion or decelerating motion by the speed control unit, the inertia estimating unit derives the inertia moment estimation value on the basis of a torque instruction value output from the speed control unit and a speed detection value or speed estimation value of the electric motor.

According to a third aspect of the present invention, in the speed control device for the electric motor of the first or second aspect of the present invention, the speed control unit is constructed by a proportional computing unit or proportional integration computing unit, and the constant setting unit sets a proportional gain of any one of the proportional computing unit and the proportional integration computing unit on the basis of a value proportional to the output value of the switching unit.

According to the present invention, when it is possible to perform the accelerating or decelerating operation of the electric motor for estimating the inertia moments of the electric motor and the driving target, this operation is carried out to estimate the inertia moment, and the control constant of the speed control unit is set on the basis of this inertia moment estimation value. When it is impossible to perform this operation, the control constant of the speed control unit can be set on the basis of the inertia moment manual set value which is manually set in the inertia setting unit.

BRIEF DESCRIPTION OF THE DRAWINGS

A fuller understanding of the present invention will become apparent upon consideration of the following detailed description taken in connection with the accompanying drawings, wherein.

DETAILED DESCRIPTION OF THE INVENTION

Figure 1:
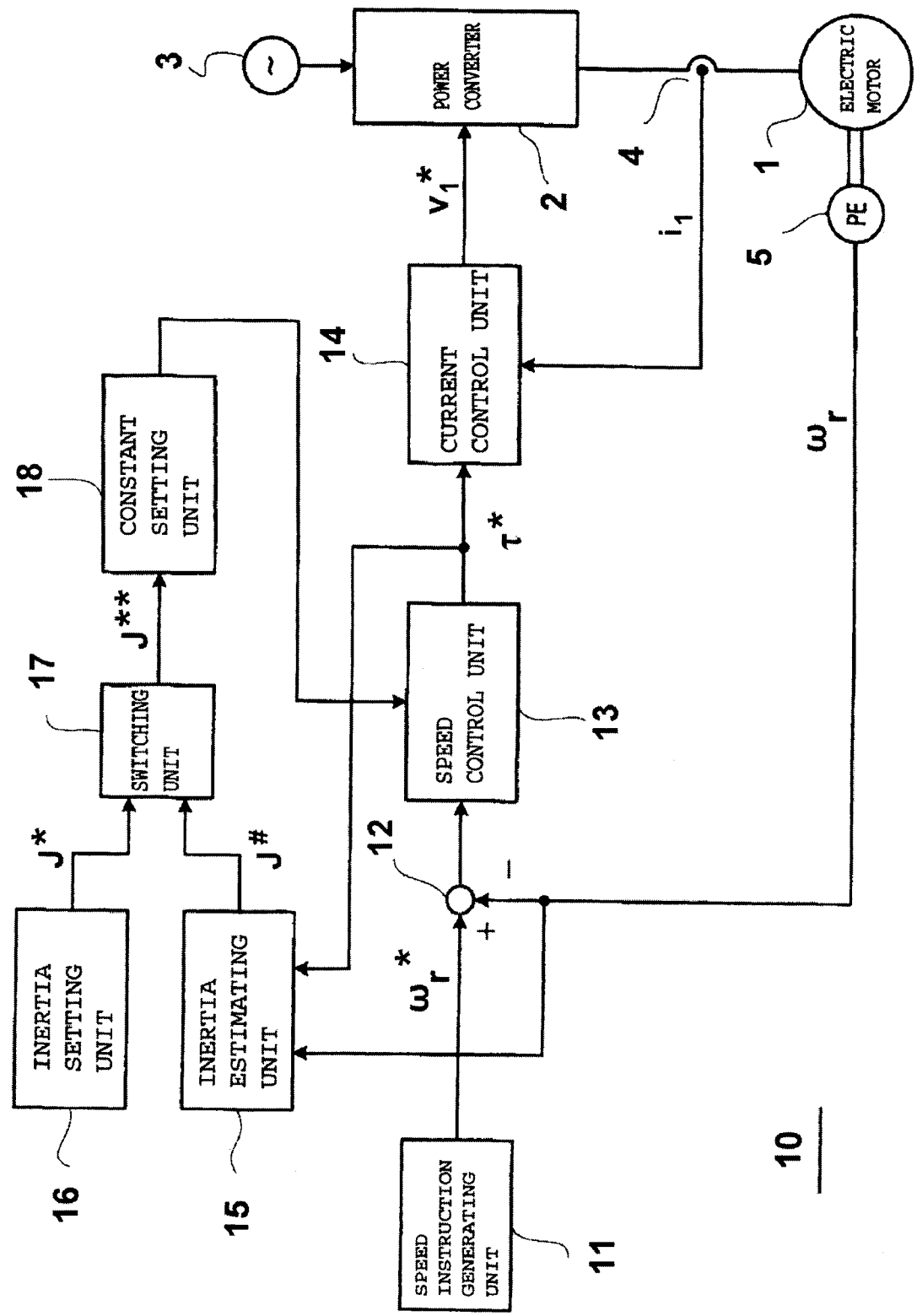
FIG. 1 is a diagram showing the circuit construction of a speed control device for an electric motor according to a first embodiment of the present invention.

FIG. 1 is a diagram showing the circuit construction of a speed control device for an electric motor according to a first embodiment of the present invention. An electric motor 1 such as an induction motor or the like is connected to a power converter 2 such as a PWM (Pulse Width Modulation) inverter for supplying the electric motor 1 with the AC voltage corresponding to a primary voltage instruction value ($V_1^*$) or the like, which is described later. An AC power source 3 is converted by the power converter 2. A current detector 4 detects the primary current ($i_1$) of the electric motor 2 and a speed detector 5 detects the speed ($\omega_r$) of the electric motor connected to the output shaft of the electric motor 1. Further, a speed control device 10 is provided.

The speed control device 10 is constructed by the following units or elements 11 to 18 described below. That is, A speed instruction generating unit 11 generates a speed instruction value ($\omega_r^*$), an addition computing unit 12 calculates the deviation between the speed instruction value ($\omega_r^*$) and the speed detection value ($\omega_r$) detected by the speed detector 5. The speed control unit 13 carries out such an adjusting operation that the deviation concerned is equal to zero, and outputs the operation result as a torque instruction value ($\tau^*$) to the electric motor 1. The current control unit 14 derives a primary current instruction value ($i_1^*$) for the electric motor 1 on the basis of the torque instruction value ($\tau^*$), and carries out such an adjusting operation that the deviation between the primary current instruction value ($i_1^*$) and the primary current detection value ($i_1$) detected by the current detector 4 is equal to zero, and then outputs the operation result as a primary voltage instruction value ($v_1^*$) to the power converter 2.

The inertia estimating unit 15 estimates the total of the inertia moments of the electric motor 1 and the driving target thereof on the basis of the speed detection value ($\omega_r$) and the torque instruction value ($\tau^*$), and outputs the estimation result as an inertia moment estimation value ($J^{\#}$). The inertia setting unit 16 manually sets the inertia moment and outputs the set inertia moment as an inertia moment manual set value ($J^*$). The switching unit 17 switches to and selects any one of the inertia moment estimation value ($J^{\#}$) and the inertia moment manual set value ($J^*$), and outputs the selection result as an inertia moment set value ($J^{}$). The constant setting unit 18 sets the control constant of the speed control unit 13 on the basis of the inertia moment set value ($J^{}$). The constituent elements of the circuit diagram shown in FIG. 1 are formed by well-known techniques, and thus the detailed description thereof is omitted.

Figure 2:
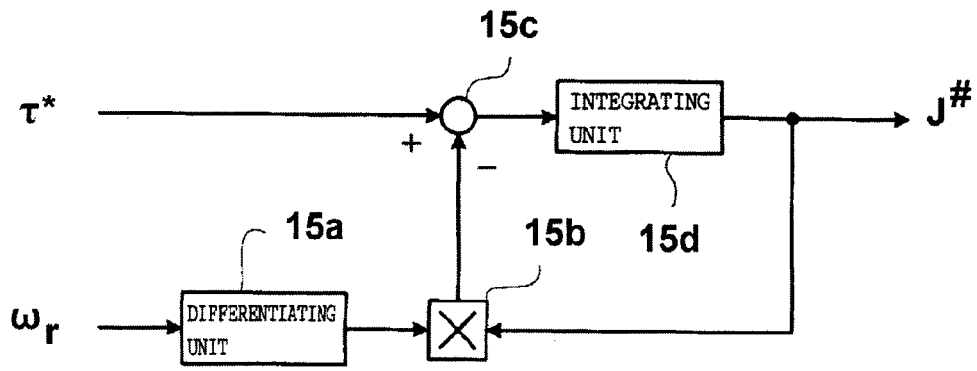
FIG. 2 is a diagram showing the partially detailed circuit diagram of the speed control device shown in FIG. 1.

FIG. 2 is a diagram showing an example of the circuit construction of the inertia estimating unit 15 shown in FIG. 1. The inertia estimating unit 15 is equipped with a differentiating unit 15a for differentiating the speed detection value ($\omega_r$) of the electric motor 1, a multiplier 15b, an addition computing unit 15c and an integrating unit 15d.

A method of deriving the inertia moment estimation value ($J^{\#}$) in the inertia estimating unit 15 will be described below.

Figure 3:
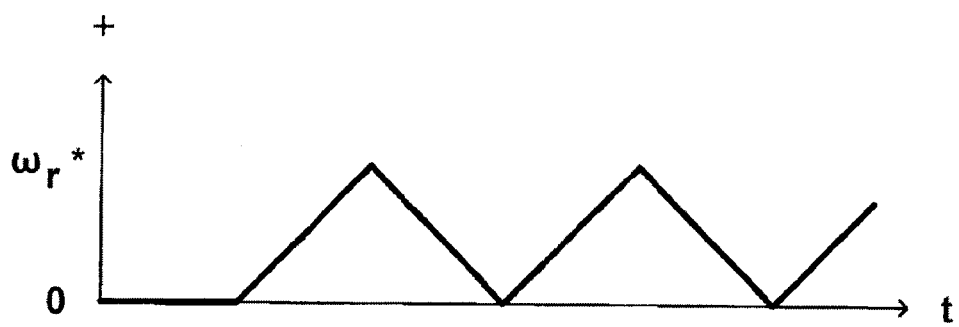
FIG. 3 is a waveform diagram showing the operation of the speed control device shown in FIG. 1.

The speed instruction value ($\omega_r^*$) is generated from the speed instruction generating unit 11 as shown in FIG. 3, and at this time the acceleration/deceleration torque ($\tau_{acc}$) of the electric motor 1 is represented by the following equation (1) under the condition that the acceleration torque of the electric motor 1 is sufficiently larger than a load torque.

$$\tau_{acc} = J \cdot \{d(\omega_r)/dt\} \tag{1}$$

Here, J represents the inertia moment, and $\omega_r$ represents the speed detection value of the electric motor 1.

When the electric motor 1 is accelerated/decelerated under a non-load condition, $\tau_{acc} = \tau^*$ and thus the inertia moment can be estimated according to the circuit construction shown in FIG. 2 by inputting the deviation between the torque instruction value ($\tau^*$) and $J^{\#} \cdot \{d(\omega_r)/dt\}$ into the integrating unit 15d and representing the output thereof to $J^{\#}$.

In other words, when the inertia moment estimation value is represented by $J^{\#}$, this value can be calculated from the arithmetic expression shown in the following equation (2).

$$J^{\#} = \int(\tau^* - J^{\#} \cdot d\omega_r/dt)dt \tag{2}$$

In the constant setting unit 18 shown in FIG. 1, when the speed control unit 13 is constructed by the proportional computing unit or the proportional integration computing unit on the basis of the inertia moment set value ($J^{**}$) selected and output by the switching unit 17, the proportional gain $K_P$ of any one of the computing units is set to a value achieved by the following equation (3).

$$K_P = K \cdot J^{**} \tag{3}$$

Here, K represents a conversion factor. When the speed control unit 13 is the proportional integration computing unit, the integration time may be further set.

In other words, according to the electric motor control device 10 shown in FIG. 1, when it is possible to perform the accelerating/decelerating operation of the electric motor to estimate the inertia moments of the electric motor 1 and the driving target thereof, this operation is carried out to derive the inertia moment estimation value ($J^{\#}$), and the proportional gain $K_P$ of the speed control unit 13 is set through the switching unit 17 and the constant setting unit 18 on the basis of the inertia moment estimation value ($J^{\#}$). When it is impossible to perform the accelerating/decelerating operation, the proportional gain $K_P$ of the speed control unit 13 is set through the switching unit 17 and the constant setting unit 18 on the basis of the inertia moment manual set value ($J^*$) which is manually set in the inertia setting unit 16.

The manual setting is carried out by calculating the overall inertia moment containing the load with the motor shaft as a reference. Furthermore, when the manual set value is greatly deviated from the actual inertia moment, there occurs a problem that the set constant of the speed control unit 13 output from the constant setting unit 18 is improper.

In other words, in the case that the actual load is greater than the manually set value, the response of the speed control unit 13 is slow, and in the case that the actual load is less than the manually set value, the response of the speed control unit 13 is excessively fast and thus vibration is liable to occur.

In any case, manual adjustment or the like is required, and the optimum countermeasure must be taken in the future.

Figure 4:
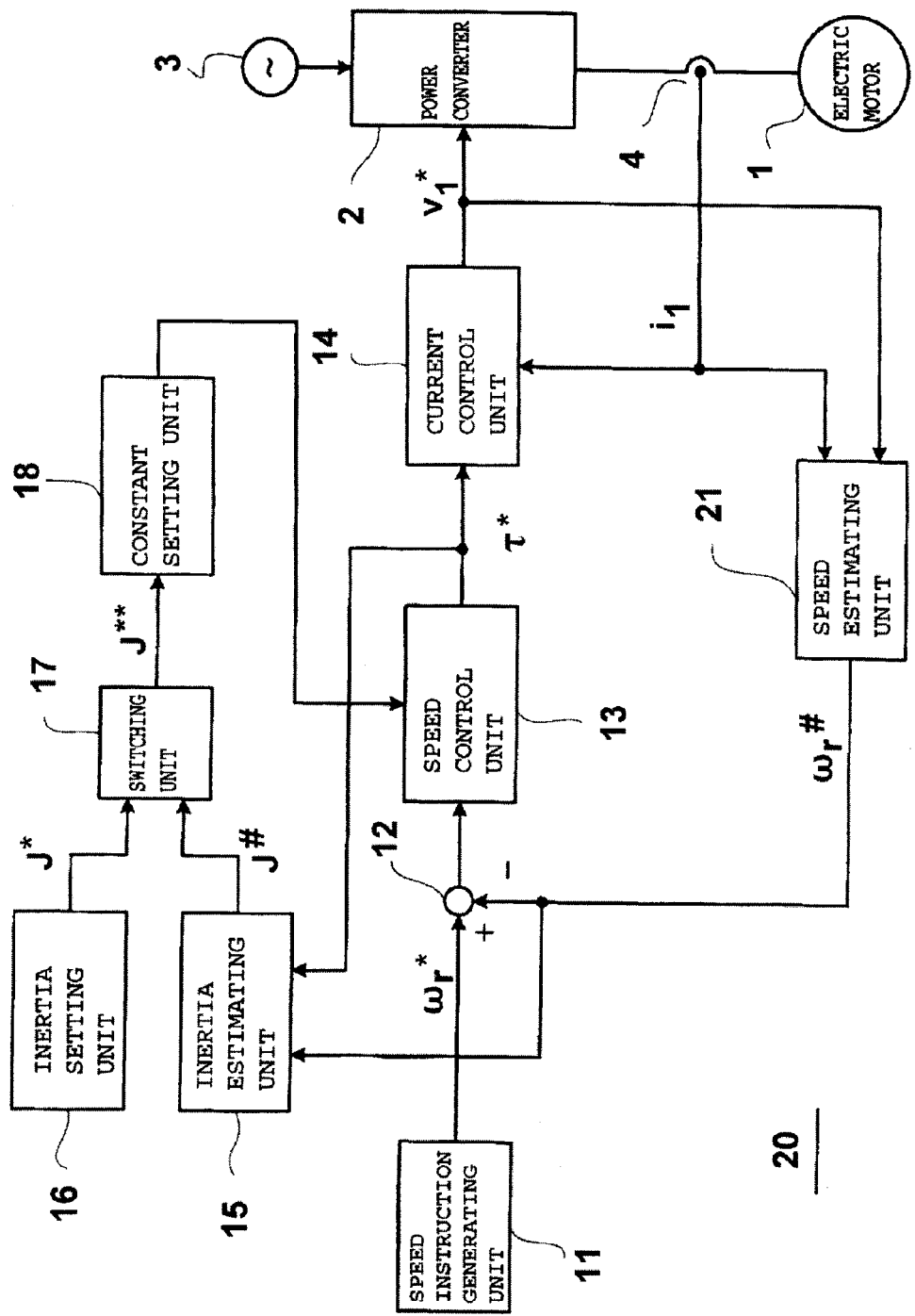
FIG. 4 is a diagram showing the circuit construction of a speed control device for an electric motor according to a second embodiment of the present invention.

FIG. 4 is a diagram showing the circuit construction of a speed control device for an electric motor according to a second embodiment of the present invention. In FIG. 4, the elements having the same functions as the circuit construction shown in FIG. 1 are represented by the same reference numerals, and the description thereof is omitted.

That is, in the circuit construction shown in FIG. 4, the speed detector 5 is omitted, and the speed control device 20 is further equipped with a speed estimating unit 21 in addition to the speed instruction generating unit 11, the addition computing unit 12, the speed control unit 13, the current control unit 14, the inertia estimating unit 15, the inertia setting unit 16, the switching unit 17 and the constant setting unit 18.

The speed estimating unit 21 is constructed by a well-known technique. For example, it is designed so that back electromotive force of the electric motor 1 is calculated from a primary voltage instruction value ($v_1^*$) and a primary current detection value ($i_1$) of the electric motor 1, and a speed estimation value ($\omega_r^{\#}$) of the electric motor 1 is derived on the basis of the back electromotive force thus calculated.

The speed estimation value $\omega_r^{\#}$ is derived by the following equation (4).

$$\omega_r^{\#} = sgn(E_T)\{(|E_T|/\phi_2) - G_{em}E_M\} \tag{4}$$

Here, $\phi_2$ represents a secondary magnetic flux, $E_M$ represents the induced voltage of a magnetic flux axis component, $E_T$ represents the induced voltage of the torque axis (perpendicular to the magnetic flux axis) component, and $G_{em}$ represents a transfer function of the adjusting unit having an input of $E_M$.

When $\omega_1^*$ represents a primary angular frequency instruction value and $\omega_s^*$ represents a slip frequency instruction value, the speed estimation value $\omega_r^{\#}$ is calculated according to the following equation (5).

$$\omega_r^{\#} = \omega_1^* - \omega_s^* \tag{5}$$

Accordingly, in the inertia estimating unit 15 of the circuit construction shown in FIG. 4, the inertia moment estimation value ($J^{\#}$) is achieved on the basis of the torque instruction value ($\tau^*$) and the speed estimation value ($\omega_r^{\#}$).

In other words, in place of the speed detection value ($\omega_r$) of the inertia estimating unit 15 shown in FIG. 2, the speed estimation value ($\omega_r^{\#}$) is substituted, and the inertia moment estimation value ($J^{\#}$) is calculated from the speed estimation value ($\omega_r^{\#}$) and the torque instruction value ($\tau^*$).

The invention has been described with reference to certain preferred embodiments thereof. It will be understood, however, that modifications and variations are possible within the scope of the appended claims.

What is claimed is:

1. A speed control device for variably controlling the speed of an electric motor by using a speed control unit in which at least a control constant is changeable, comprising:
   an inertia estimating unit for estimating the total of inertia moments of the electric motor and a driving target thereof, and outputting the estimated total inertia moment as an inertia moment estimation value,
   an inertia setting unit for manually setting an inertia moment by an operator and outputting the manually set inertia moment as an inertia moment manual set value;
   a switching unit for switching to and outputting one of the inertial moment estimation value and the inertia moment manual set value in accordance with whether the inertia moment can be estimated or not; and
   a constant setting unit for setting a control constant of the speed control unit on the basis of the output value of the switching unit.

2. The speed control device for the electric motor according to claim 1, wherein when the electric motor is controlled to carry out an accelerating or decelerating operation by the speed control unit, the inertia estimating unit derives the inertia moment estimation value on the basis of a torque instruction value output from the speed control unit and the speed detection value or the speed estimation value of the electric motor.

3. The speed control device for the electric motor according to claim 2, wherein the speed control unit is constructed by any one of a proportional computing unit and a proportional integration computing unit, and the constant setting unit sets the proportional gain of any one of the computing units on the basis of a value proportional to the output value of the switching unit.

4. The speed control device for the electric motor according to claim 1, wherein the speed control unit is constructed by any one of a proportional computing unit and a proportional integration computing unit, and the constant setting unit sets the proportional gain of any one of the computing units on the basis of a value proportional to the output value of the switching unit.

5. The speed control device for the electric motor according to claim 1, wherein the manual setting is carried out by calculating the overall inertia moment containing the load with a shaft of the motor as a reference.

* * * * *